United States Patent
Tatum et al.

(10) Patent No.: US 7,295,733 B2
(45) Date of Patent: Nov. 13, 2007

(54) POWER AND ENCIRCLED FLUX ALIGNMENT

(75) Inventors: James Tatum, Plano, TX (US); James Guenter, Garland, TX (US); Jack Gilkerson, Wylie, TX (US)

(73) Assignee: Finisar Corporation, Sunnyvale, CA (US)

( * ) Notice: Subject to any disclaimer, the term of this patent is extended or adjusted under 35 U.S.C. 154(b) by 0 days.

(21) Appl. No.: 11/157,564

(22) Filed: Jun. 21, 2005

(65) Prior Publication Data

US 2006/0285800 A1    Dec. 21, 2006

(51) Int. Cl.
  *G02B 6/26*    (2006.01)
  *G02B 6/36*    (2006.01)
(52) U.S. Cl. .......................................... 385/52; 385/88
(58) Field of Classification Search .................. 385/52
  See application file for complete search history.

(56) References Cited

U.S. PATENT DOCUMENTS

| | | | |
|---|---|---|---|
| 4,746,195 A * | 5/1988 | Auracher et al. ............. 385/52 |
| 4,854,667 A * | 8/1989 | Ebata et al. ................. 385/134 |
| 6,530,697 B1 * | 3/2003 | Johnson et al. ............... 385/88 |
| 2002/0081075 A1 * | 6/2002 | Miyazaki ..................... 385/49 |
| 2004/0051880 A1 * | 3/2004 | Seko et al. ................. 356/614 |
| 2004/0160998 A1 * | 8/2004 | Gruhlke et al. ........ 372/29.021 |

FOREIGN PATENT DOCUMENTS

JP    06259781 A *    9/1994

\* cited by examiner

*Primary Examiner*—Michelle Connelly-Cushwa
*Assistant Examiner*—Kajli Prince
(74) *Attorney, Agent, or Firm*—North Weber & Baugh LLP

(57) ABSTRACT

A system and method for aligning optical components based on coupled optical power and encircled flux is described. In one embodiment of the invention, coupled power and encircled flux is measured corresponding to multiple locations of a first optical component relative to a second optical element. The measured coupled power and encircled flux values are analyzed and an appropriate location of the first optical component relative to the second optical component is selected.

20 Claims, 4 Drawing Sheets

POWER AND ENCIRCLED FLUX ALIGNMENT

BACKGROUND

A. Technical Field

The present invention relates generally to the field of optics and more particularly to a system and method for alignment of optical components.

B. Background of the Invention

The importance of aligning optical components within an optical path is well known. An optical path may include various components such as an optical transmitter, fiber optic cable and an optical receiver or detector. The optical transmitter generates and transmits an optical signal using a light source, such as a laser, and corresponding control circuitry. This light source may take the form of a light emitting diode, solid-state laser diode, or other type of light source to generate the optical signal.

The optical transmitter is coupled to optical fiber in which the optical signal propagates. The optical fiber consists of one or more glass fibers, which act as wave-guides for the optical signal. The optical fiber needs to be appropriately aligned or placed in very close proximity to the light-emitting region of the source in order to couple as much light as possible into the fiber. Typically, an optical subassembly or lens barrel is used to couple a light source to a fiber optic cable.

Light sources may be aligned to two different types of optical fiber, which are classified as single-mode fibers and multi-mode fibers. Single-mode fiber is designed with a relatively narrow core diameter, through which only one mode of light propagates. Multi-mode fiber carries numerous modes or light rays simultaneously. Accordingly, this fiber type has a much larger core diameter, allowing for the larger number of modes. The lower order modes, having small propagation angles, strike at or near the center of the fiber, and tend to travel straight down the fiber. On the other hand, higher modes, which do not propagate in the center of the fiber, travel a longer optical path length and thus appear have comparatively low speed of propagation. This is known in the industry as modal dispersion in an optical fiber.

The optical receiver or the detector receives the optical signal from the optical fiber and converts the optical signal back into the original electrical signal. This detector may be mounted in an optical subassembly, similar to the one used for the transmitting optical subassembly, which couples to an optical fiber. Detectors usually have a preferred detecting region and power range that can vary according to the type of detector used.

An optical power may be measured that represents an intensity of light provided by a light source and/or optical fiber at an optical detector. It is desirable to provide the optical signal within a desired power range that is optimal for the particular detector. Optical detectors typically have a pre-defined power range in which the optical detection may be accurately performed. If the power level should drop out of this range, then the detector's performance will likely suffer. Furthermore, optical detectors may be sensitive to the location in which an optical signal strikes the detector. Depending on the characteristics of the fiber (including the type of fiber) and the coupling between the light source and the fiber, an optical signal may be received at various physical locations on a detector.

Encircled flux describes the power encircled within a circular radius inside the optical fiber and denotes the laser flux energy that is coupled into the fiber. Encircled flux is obtained from the near-field intensity pattern produced by a laser source in a graded-index multimode fiber. As the coupling between a light source and a fiber changes, the flux within a circular radius inside the optical fiber may change significantly. Furthermore, a change in coupling or fiber characteristics may result in a change to a corresponding encircled flux value without necessarily changing the effective coupling power.

In current alignment systems, encircled flux is not simultaneously monitored with effective coupling power. Typically, an alignment is performed relative to effective coupling power. After the power alignment is complete, the light source and coupled fiber may be analyzed to relative to encircled flux using a completely different physical measurement on the previously power-aligned light source and coupled fiber.

SUMMARY OF THE INVENTION

The present invention is directed to a system and method for aligning optical components based on both encircled flux and optical power, which considerably overcomes the limitations and disadvantages of the related art.

In one embodiment of the present invention, a system is provided that includes a light source contactor that moves within a three dimensional space and provides power to the light source, a lens barrel that couples light into optical fiber, a piece of optical fiber, an optical detector, and a processing device connected to the optical detector that measures and calculates both power and encircled flux. The optical detector may be positioned in a camera that detects and stores an optical output at certain points in time. Also, the processing device may be a computer, having software that calculates the power and encircled flux associated with a particular optical output provided by the camera. Furthermore, a feedback loop may be included which controls the position of the light source contactor in X, Y, Z-axes to get the precise location for any flux and power parameter of the fiber coupling and monitoring the change in encircled flux.

In one embodiment of the present invention, a method is provided for measuring both power and encircled flux within a single alignment system. This method allows for alignment relative to both optical characteristics and provides means for optimally coupling a light source and an optical subassembly according to these characteristics. For example, based on a measured output power and encircled flux, a laser may be automatically adjusted to a relative position for launching an appropriate amount of light into a multi-mode fiber. In another example, the laser may be manually adjusted according to measured power and encircled flux. The change in the encircled flux may be actively monitored during the alignment process on a monitor screen of the computer.

In one embodiment of the present invention, a control unit may be used in conjunction with or in place of a computer. The control unit may be connected to a keyboard for input of data and a video monitor for visualizing the images of the camera system. The control unit may be supported by analysis software to provide feedback to the contactor so that the light source may be adjusted in the three dimensional space and an appropriate alignment of the laser to the optical subassembly or a lens barrel may be achieved.

BRIEF DESCRIPTION OF THE DRAWINGS

Reference will be made to embodiments of the invention, examples of which may be illustrated in the accompanying

DETAILED DESCRIPTION OF THE PREFERRED EMBODIMENTS

A system and method for aligning optical components is described. One embodiment of the present invention aligns a light source to an optical subassembly based on an analysis of output power and encircled flux. The term optical subassembly is intended to be given its broadest definition, which may be a lens barrel, a lens barrel with other optical features, or any other subassembly to which a piece of optical fiber may be connected. The present invention may be applied to many different optical components, including various light sources such as lasers and light emitting diodes, which require an alignment in order to be coupled to other optical components.

In the following description, for purpose of explanation, specific details are set forth in order to provide an understanding of the invention. It will be apparent, however, to one skilled in the art that the invention may be practiced without these details. One skilled in the art will recognize that embodiments of the present invention, some of which are described below, may be incorporated into a number of different devices including computers, cameras, and other processing devices. Certain features of the present invention may also be present in software, hardware or firmware. Structures and devices shown below in block diagram are illustrative of exemplary embodiments of the invention and are meant to avoid obscuring the invention. Connections between components and modules, within these block diagrams, are not necessarily intended to refer to direct connections. Rather, data transmitted between components and modules may be re-formatted, manipulated or otherwise processed by intermediary components or modules.

Reference in the specification to "one embodiment" or "an embodiment" means that a particular feature, structure, characteristic, or function described in connection with the embodiment is included in at least one embodiment of the invention. The appearances of the phrase "in one embodiment" in various places in the specification are not necessarily all referring to the same embodiment.

A. Method Overview

Figure 1:
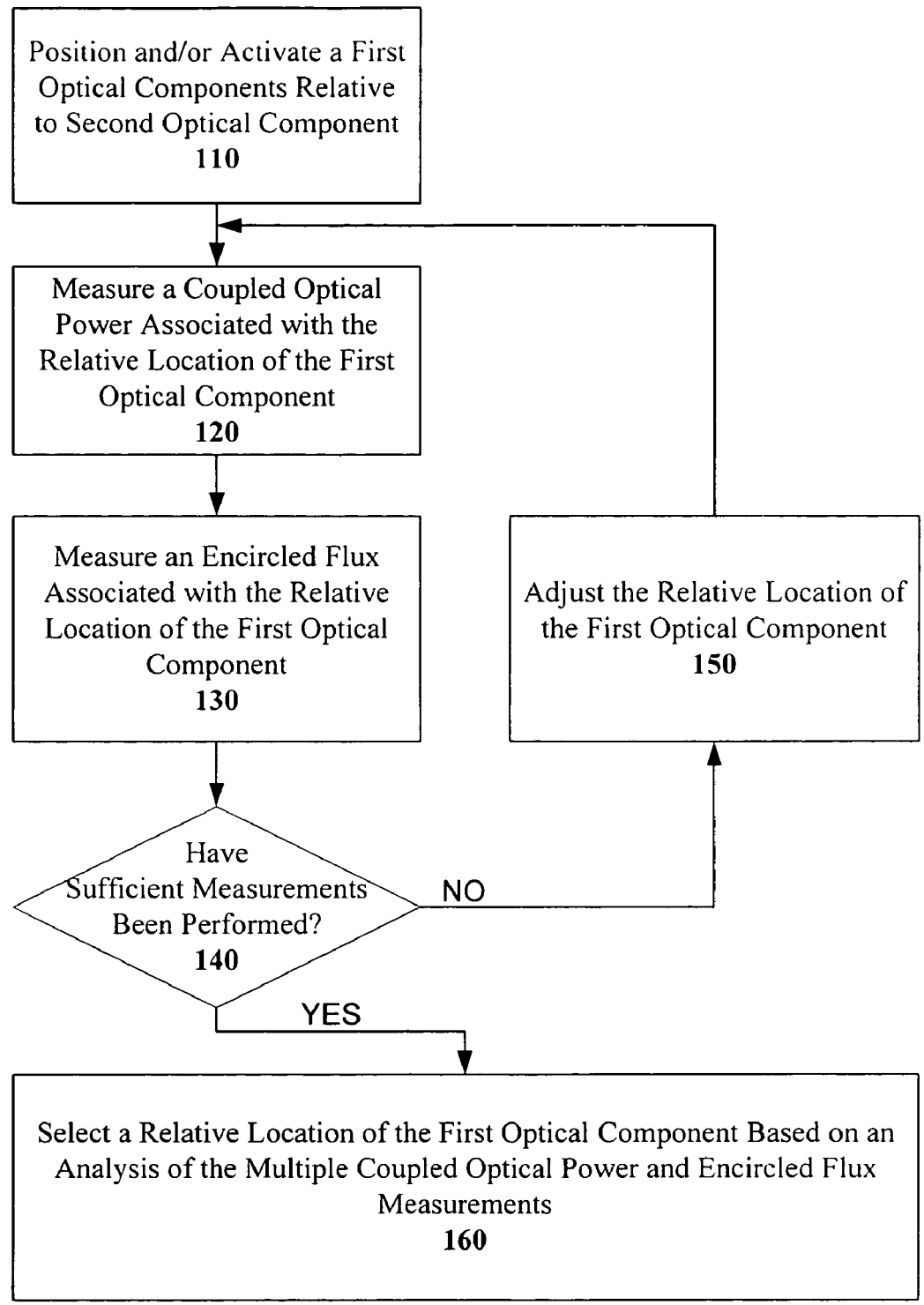
FIG. 1 is a general flowchart illustrating a method for aligning optical components according to one embodiment of the invention.

A system for aligning optical components based on optical power and encircled flux is described. FIG. 1 illustrates such an alignment method 100 according to one embodiment of the invention.

Optical components are positioned and/or activated 110 (depending on the type of optical component) so that light may be generated, transmitted, received, or otherwise manipulated by the optical components. These optical components may include light sources, amplifiers, optical fiber, optical splitters and taps, detectors and other optical components that may be positioned within an optical connection.

The optical components are positioned to form an optical path on which optical light may propagate and be analyzed. A first optical component is moved relative to at least one other optical component so that the characteristics of the optical path may change and be measured. A coupled optical power measurement is performed 120 at an output on the optical path by an alignment system. This coupled output power relates to the intensity of light that is output from the optical path. Also, an encircled flux measurement is preformed 130 at the output of the optical path by the same alignment system. The encircled flux represents the light pattern generated at the optical path output. These coupled power and encircled flux measurements may be stored for later analysis The purpose of these measurements is to identify an appropriate optical component alignment that generates a preferred coupled power and encircled flux. That being said, multiple output power and encircled flux measurements should be performed relating to various relative positions of the first optical component so that an appropriate analysis may be performed. In one embodiment of the invention, a threshold 140 is defined that determines the number of optical component movements, and corresponding coupled power and encircled flux measurements, that are performed. This threshold may be based on identifying a sufficiently compliant coupled power and encircled flux for the optical path. This threshold may also be based purely on the number of times the first optical component is moved and corresponding measurements taken. One skilled in the art will recognize that various thresholds may be defined to stop the movement of the first optical component and recording coupled power and encircled flux.

If additional optical coupled power and encircled flux measurement are to be performed, the relative location of the first optical component is adjusted 150. Thereafter, coupled power and encircled flux corresponding to the adjusted relative location are measured and recorded. If sufficient measurements have been performed, then an analysis 160 is performed to identify an appropriate location of the first optical component relative to the other(s) optical components in the optical path.

This relative location defines an appropriate alignment of the optical components. The optical components may be secured to each other in order to preserve the alignment during future use. For example, a laser may be aligned and coupled to an optical subassembly by curing, with ultraviolet light, adhesive material coupling the laser and subassembly together. One skilled in the art will recognize that the integration of both output power and encircled flux measurements into a single alignment system provides a user advantages in optimizing the coupling between optical components.

B. System Overview

Figure 2:
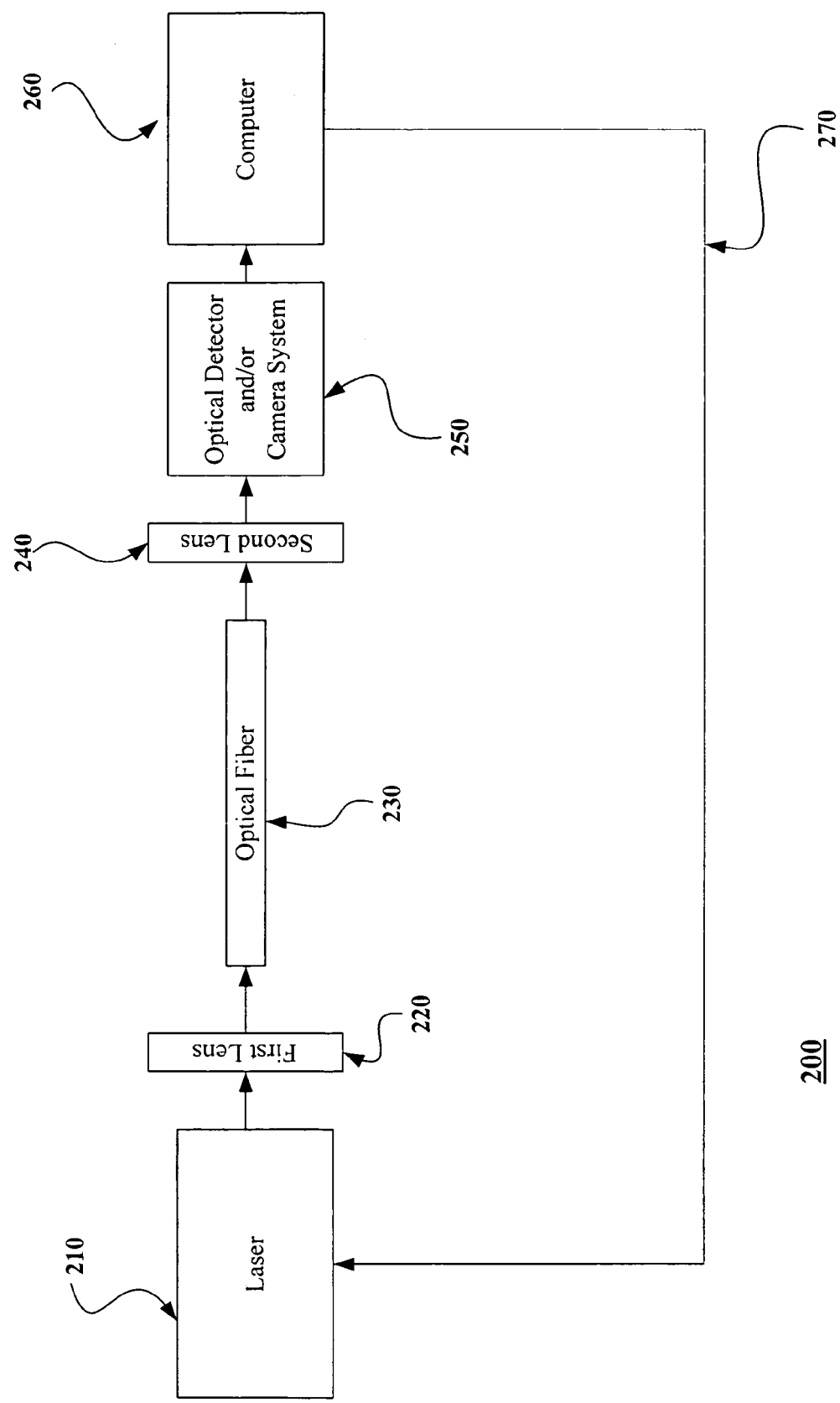
FIG. 2 is a schematic view of an optical component alignment system according to one embodiment of the invention.

FIG. 2 is a general block diagram illustrating an optical alignment system for a laser and optical subassembly according to one embodiment of the invention. One skilled in the art will recognize that the system may be applied to the alignment of various other optical components.

According to one embodiment of the invention, the alignment system 200 includes a first lens 220 that is introduced between a laser 210 and an optical fiber 230 to couple laser light into the optical fiber 230. This first lens 220 may be contained within a lens barrel or other optical subassembly. The lens barrel may also include a means for aligning an optical fiber to a lens assembly. Depending on the application, the first lens 220 may provide relatively high magnification which converts a large-angle light pattern from the laser 210 into a small-angle pattern to obtain highest coupling of light to the optical fiber 230.

The other end of the fiber 230 may be connected to a second lens 240, which transfers light from the optical fiber 230 to an optical detector 250. This optical detector 250 may be included within a camera, such as a CCD camera, which can measure power and capture a picture of encircled flux inside the optical fiber 230. Information from the optical detector 250 may be provided to a processing device 260 so that output power and encircled flux may be analyzed. For example, a camera system (e.g., Win CamD Camera System) may transfer an image of a particular output power and encircled flux to a computer. This image may be stored and/or analyzed to try and identify an appropriate location of the laser 210 that generates an appropriate coupled power and encircled at the output of the optical path.

A visual representation of encircled flux may also be displayed to a user so that manual analysis may be performed. Furthermore, the system 200 may also include a feedback loop 270 that adjusts the location of the laser 210 so that additional power and encircled flux measurements may be performed. Computer software may be employed that control the feedback loop 270, and position of the laser 210, so that a preferred laser location may be automatically determined.

The laser location may be refined by actively manipulating the laser 210 within a three dimensional space in order to achieve the highest power coupling. An iterative process may be performed in which the laser 210 is moved according to an analysis algorithm relating to measured coupled power and encircled flux.

Certain components, within the system 200, may need to be calibrated in order for proper performance. For example, a power calibration may be performed using a LED and power meter from which the optical detector/camera power measurements may be calibrated. A centroid calibration may be performed by using the LED and adjusting the size and location of the image on the camera. A diameter calibration may also be performed using the LED and a known fiber (e.g., 50 µm) to set the diameter measurements.

a) Encircled Flux Alignment

Figure 3:
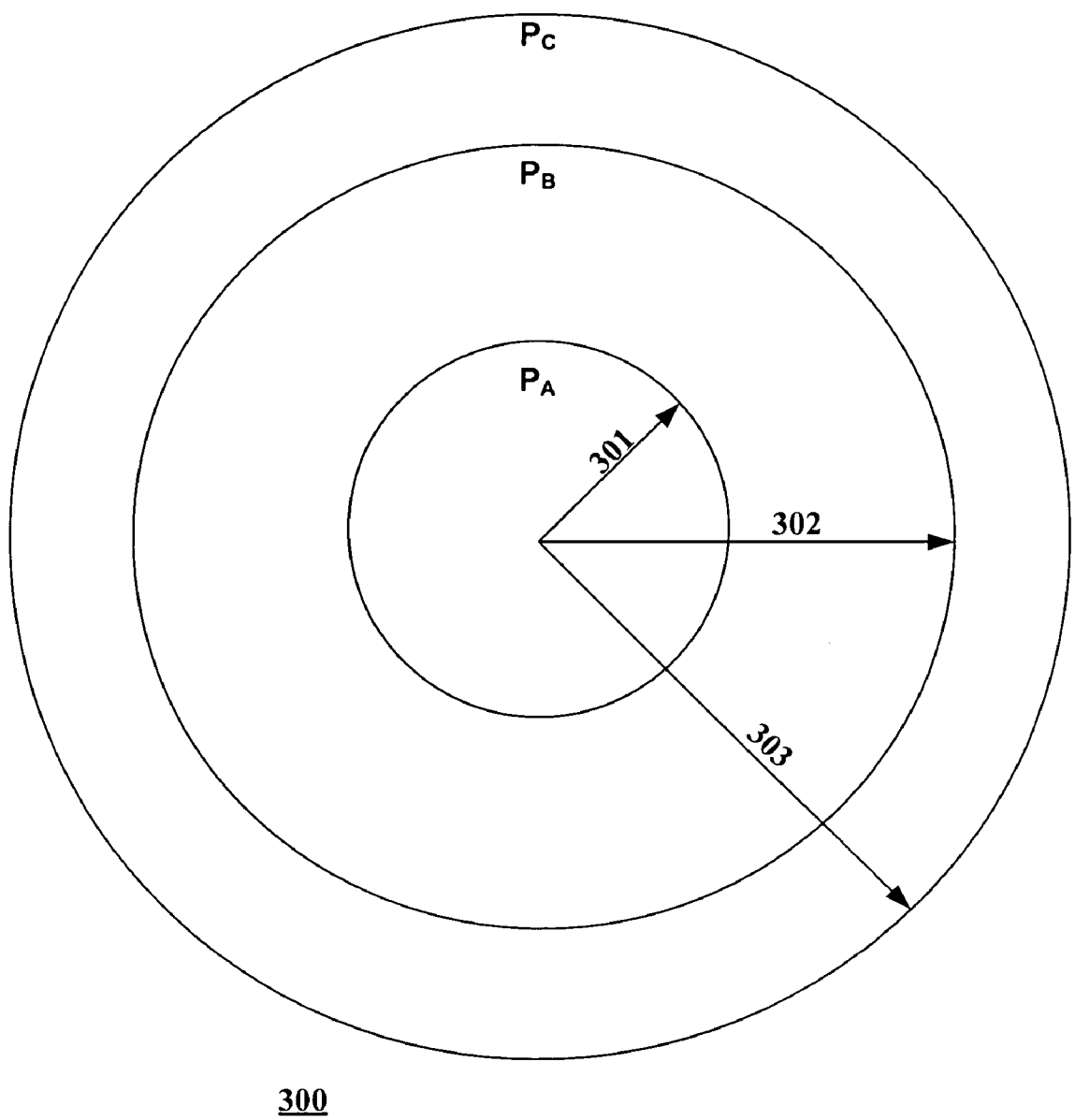
FIG. 3 is a depiction of a fiber core with various radii, which forms different areas and specific powers within their respective areas.

As discussed above, one factor in the alignment of optical components is encircled flux, namely the pattern of light that is in specific regions of the fiber. This is more clearly shown in FIG. 3, which is a depiction of a fiber core 300 with various radii $R_a$ 301 $R_b$ 302 and $R_c$ 303 indicating the radius of area A, the radius of area B and the radius of the fiber core respectively. In one embodiment of the present invention, the core has a 50 µm diameter. FIG. 3 also depicts specific output powers associated with different areas of the fiber core given as $P_a$ (the coupled power within area A), $P_b$ (the coupled power within area B), and $P_c$ (the total coupled power in the core). Various standards and specifications may define particular power levels or quantities of light within each of these regions where $P_a \leq YY\%$ of $P_c$ and $P_b \geq ZZ\%$ of $P_c$. The present invention would allow for efficient analysis of compliance in both coupling efficiency and encircled flux.

C. VCSEL Alignment to Lens Barrel

Figure 4:
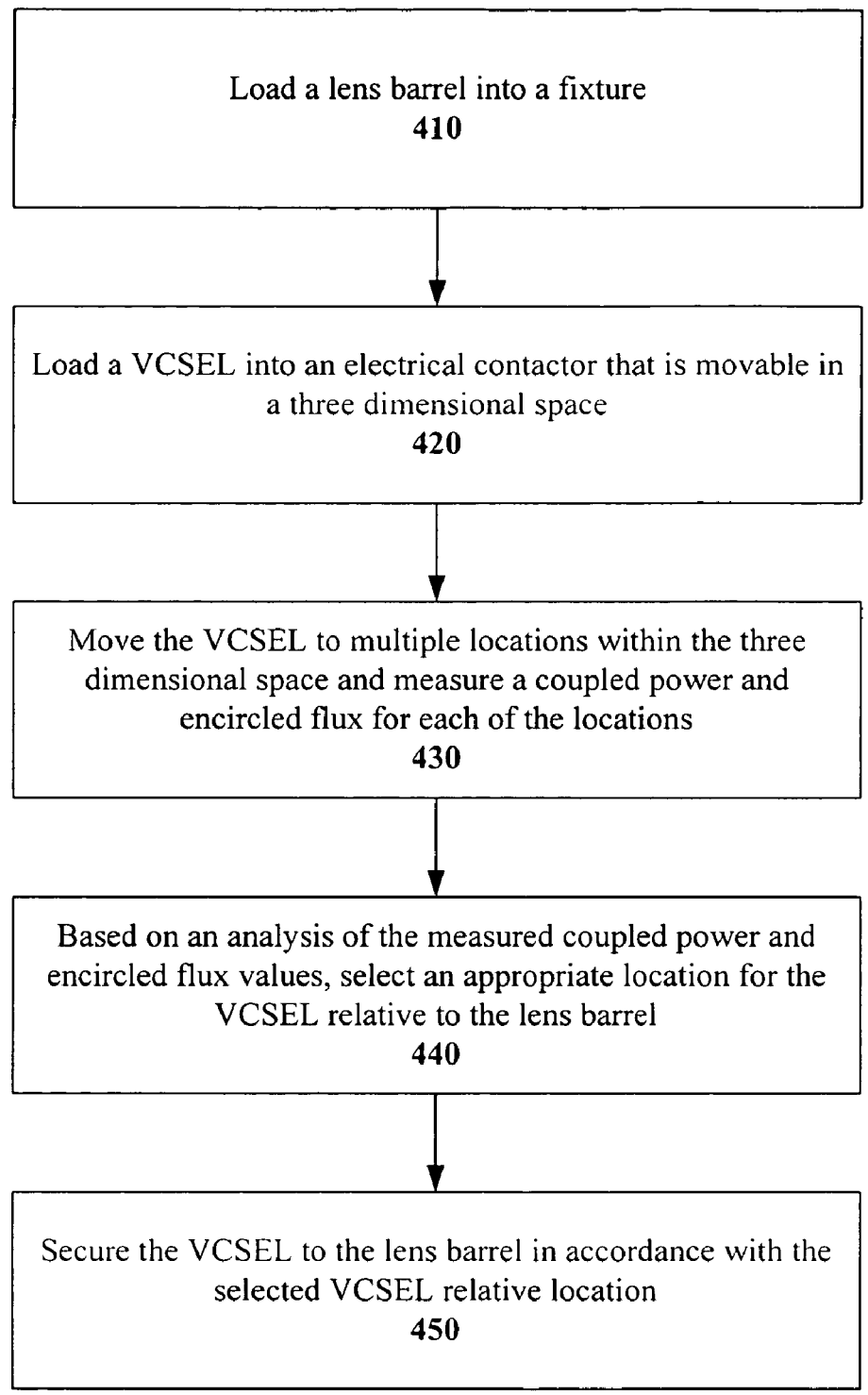
FIG. 4 is a detailed flowchart illustrating a method for aligning a VCSEL to an optical subassembly according to one embodiment of the invention.

FIG. 4 illustrates a method 400 of aligning a vertical cavity surface emitting laser ("VCSEL") to a lens barrel. The VCSEL and lens barrel are prepared for the alignment process. The lens barrel may be seated on a piece of optical fiber. Also, an adhesive may be applied to the VCSEL and lens barrel so that they may be securely coupled to each other after appropriately aligned. For example, an ultraviolet tack adhesive, such as Dymax adhesives, may be applied to certain contact points on the VCSEL and lens barrel.

The lens barrel is loaded 410 into a fixture that allows light from the VCSEL to enter the lens barrel. In one embodiment, the fixture may provide rotational movement to allow the lens barrel to rotate relative to the VCSEL.

The VCSEL is loaded 420 into an electrical contactor to provide electrical power and movement within a three dimensional space relative to the lens barrel. In one embodiment, the electrical contactor may be a wireless zero insertion force wand ("ZIF wand"). The ZIF wand is able to move either manually by a user or automatically based on feedback from the system.

The VCSEL is moved to multiple locations within the three dimensional space and corresponding output coupled power and encircled flux are measured 430 for each location. This measurement may be performed by various devices including a CCD camera. The output power and encircled flux measurements are stored and analyzed 440 to try and identify and appropriate location of the VCSEL. For example, in one embodiment of the invention, the VCSEL is aligned to the location with the highest measured coupled power that also complies with the encircled flux requirements of a relevant standard, such as for example the encircled flux requirements described in the TIA-455-203 standard specification. For another example, the VCSEL may be aligned neither to the highest coupled optical power nor to the optimal encircled flux, but instead aligned to a position with acceptable values of both, but a large tolerance to subsequent small misalignment.

Once a VCSEL location is identified based on the analysis of both coupled power and encircled flux, the adhesive material is cured 450 so that the VCSEL is secured to the lens barrel.

In one embodiment of the invention, the system could be supported by a control unit that automatically moves the VCSEL in response to a measured coupled power and encircled flux. This control unit may be connected to a keyboard for input of data and a video monitor for visualizing the images of the camera system. The control unit may be supported by the analysis software to provide feedback to the laser so as to adjust the laser in X, Y, Z-axes for correct alignment of the VCSEL to the fiber.

The above description is included to illustrate embodiments of the present invention and is not meant to limit the scope of the invention. Those having skill in the art will recognize additional modifications and embodiments and it will be apparent that any modification and variation may be effected without departing from the scope of the novelty of the present invention

We claim:

1. A method for aligning a first optical component to a second optical component, the method comprising:

positioning the first optical component relative to the second optical component;

causing an optical signal to be transmitted through the second optical component;

measuring a coupled power at an optical detector, wherein the measured coupled power is associated with the position of the first optical component;

measuring an encircled flux at the optical detector, wherein the measured encircled flux is associated with the position of the first optical component;

analyzing the measured coupled power and measured encircled flux to select a location for the first optical component relative to the second optical component; and wherein a single optical detector is used to measure the coupled power and the encircled flux.

2. The method of claim 1 further comprising the step of securing the first optical component to the second optical component to maintain the selected relative location of the first optical component.

3. The method of claim 1 wherein the first optical component is a laser and the second optical component is an optical subassembly.

4. The method of claim 3 wherein the laser is a vertical cavity surface emitting laser.

5. The method of claim 3 wherein the optical subassembly is a lens barrel.

6. The method of claim 1 wherein the analysis of the measured coupled power comprises comparing a first measured coupled power to a second measured coupled power.

7. The method of claim 6 wherein the analysis of the measured encircled flux comprises comparing the measure encircled flux to standard specification.

8. The method of claim 1 further comprising the step of automatically adjusting a location of the first optical component based on the analysis of the measured coupled power and measured encircled flux.

9. The method of claim 8 wherein the automatically adjusting of the location of the first optical component is performed through feedback by a control unit.

10. A system for aligning a first optical component with a second optical component, the system comprising:
an electrical contactor that secures a first optical component and provides movement within a three dimensional space;
a fixture that secures a second optical component;
an optical detector positioned to detect a single optical signal from the second optical component;
a processing device, coupled to the single optical detector, that calculates a coupled power and encircled flux of the detected optical signal associated with a location of the first optical component relative to the second optical component.

11. The system of claim 10 wherein the first optical component is a laser.

12. The system of claim 11 wherein the laser is a vertical cavity surface emitting laser.

13. The system of claim 10 wherein the second optical component is an optical subassembly.

14. The system of claim 13 wherein the optical subassembly is a lens barrel.

15. The system of claim 10 wherein the optical detector is positioned within an optical camera.

16. The system of claim 15 wherein the optical camera is selected from the group consisting of a CCD camera and a CMOS camera.

17. The system of claim 10 wherein the processing device is a computer that has memory for storing the measured coupled power and measured encircled flux.

18. The system of claim 17 further comprising a control unit, coupled to the computer, which controls the location of the first optical component based on an analysis of the measured coupled power and encircled flux.

19. A computer program product embodied on a computer readable medium for enabling the measurement of coupled power and encircled flux of an optical signal, the computer program product comprising computer instructions for:
receiving information, from a single optical detector, describing the intensity and location of the optical signal;
calculating a coupled power, using the received information, which is associated with the optical signal;
calculating an encircled flux, using the received information, which is associated with the optical signal;
adjusting a location of an optical component based on the calculated coupled power and encircled flux; and
wherein the single optical detector is located in a single optical alignment system.

20. The computer program product of claim 19 further comprising computer instructions for controlling a location of a first optical component relative to a second optical component based on the calculated coupled power and encircled flux.

* * * * *